US011870149B2

(12) United States Patent
Hayes et al.

(10) Patent No.: US 11,870,149 B2
(45) Date of Patent: Jan. 9, 2024

(54) DIRECTIVE BEAMFORMING ANTENNA

(71) Applicant: SMARTSKY NETWORKS LLC, Morrisville, NC (US)

(72) Inventors: Gerard James Hayes, Wake Forest, NC (US); Koichiro Takamizawa, Silver Spring, MD (US); James O. Legvold, Willow Park, TX (US); Elbert Stanford Eskridge, Jr., Chapel Hil, NC (US); Mike Barts, Raleigh, NC (US); John Swartz, Durham, NC (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 304 days.

(21) Appl. No.: 17/297,040

(22) PCT Filed: Nov. 22, 2019

(86) PCT No.: PCT/US2019/062799
§ 371 (c)(1),
(2) Date: May 26, 2021

(87) PCT Pub. No.: WO2020/112543
PCT Pub. Date: Jun. 4, 2020

(65) Prior Publication Data

US 2022/0029307 A1 Jan. 27, 2022

Related U.S. Application Data

(60) Provisional application No. 62/772,874, filed on Nov. 29, 2018.

(51) Int. Cl.
*H01Q 21/20* (2006.01)
*H01Q 1/24* (2006.01)
(Continued)

(52) U.S. Cl.
CPC ........... *H01Q 21/205* (2013.01); *H01Q 1/246* (2013.01); *H01Q 1/28* (2013.01); *H01Q 3/36* (2013.01)

(58) Field of Classification Search
CPC ........ H01Q 21/205; H01Q 1/246; H01Q 1/28; H01Q 3/36; H01Q 25/00
See application file for complete search history.

(56) References Cited

U.S. PATENT DOCUMENTS 87,441,360 6/2014 Zheng
9,491,635 B2 * 11/2016 Hyslop ................ H04W 16/28
(Continued)

FOREIGN PATENT DOCUMENTS

JP H01256201 A 10/1989
JP H09321525 A 12/1997
WO 2013089731 A1 6/2013

OTHER PUBLICATIONS

International Search Report and Written Opinion of International Application No. PCT/US2019/062799 dated Mar. 2, 2020, all enclosed pages cited.

*Primary Examiner* — Vibol Tan
(74) *Attorney, Agent, or Firm* — Burr & Forman LLP

(57) ABSTRACT

An antenna assembly includes a plurality of antenna elements disposed in a circular pattern and equidistant from each other in angular separation relative to a common reference point at a center of the circular pattern. The antenna assembly may include or be operably coupled to a phase control module configured to apply selected phase fronts to each of the antenna elements to generate constructive and destructive interference patterns to define a directive beam in a desired direction. The selected phase fronts may include no phase adjustment, a positive phase adjust-
(Continued)

ment value and a negative phase adjustment value, the positive and negative phase adjustment values each having a same magnitude.

15 Claims, 7 Drawing Sheets

(51) Int. Cl.

| | |
|---|---|
| ***H01Q 1/28*** | (2006.01) |
| ***H01Q 3/36*** | (2006.01) |

(56) References Cited

U.S. PATENT DOCUMENTS

| | | | | |
|---|---|---|---|---|
| 10,911,105 | B2 * | 2/2021 | Hyslop | H04B 7/0617 |
| 2005/0259005 | A1 * | 11/2005 | Chiang | H01Q 25/00 342/373 |
| 2010/0124210 | A1 | 5/2010 | Lo | |
| 2014/0292578 | A1 * | 10/2014 | Ibrahim | H01Q 1/1257 342/368 |
| 2016/0205560 | A1 * | 7/2016 | Hyslop | H04W 16/14 455/454 |

* cited by examiner

DIRECTIVE BEAMFORMING ANTENNA

CROSS REFERENCE TO RELATED APPLICATIONS

This application claims priority to U.S. application No. 62/772,874 filed Nov. 29, 2018, the entire contents of which are hereby incorporated by reference in its entirety.

TECHNICAL FIELD

Example embodiments generally relate to wireless communications and, more particularly, relate to an antenna assembly configured to enable directivity over 360 degrees around the antenna assembly.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility.

However, in spite of the familiarity that people have with remaining continuously connected to networks while on the ground, people generally understand that easy and/or cheap connectivity will tend to stop once an aircraft is boarded. Aviation platforms have still not become easily and cheaply connected to communication networks, at least for the passengers onboard. Attempts to stay connected in the air are typically costly and have bandwidth limitations or high latency problems. Moreover, passengers willing to deal with the expense and issues presented by aircraft communication capabilities are often limited to very specific communication modes that are supported by the rigid communication architecture provided on the aircraft.

As improvements are made to network infrastructures to enable better communications with in-flight receiving devices of various kinds, one area in which improvement may be possible is the airborne antenna. Due to limitations created by size and weight, as well as the rigors of certification requirements, a typical aviation antenna includes a flush-mounted (e.g. cavity, patch, and slot) element or an above-surface (e.g. monopole and dipole) configuration. In order to reduce or minimize aerial resistance (drag), a low mechanical form factor is also generally desirable. Accordingly, above-surface antennas are typically designed to provide a relatively broad area of coverage with a relatively low-gain. Thus, above-surface antennas are frequently constructed using ¼-wave, vertically-polarized monopole antennas or elevated horizontally-polarized dipoles. However, as the demand for improved performance of wireless communications with aviation platforms increases, the legacy designs for aviation antennas will also require improvement.

BRIEF SUMMARY OF SOME EXAMPLES

Some example embodiments may therefore provide antenna configurations that deliver improved characteristics which, when translated into network usage, may improve network performance so that air-to-ground (ATG) networks can perform at expected levels within reasonable cost structures. In some embodiments, an omni-directional antenna configuration may be provided that can be employed in connection with directive and/or reflective elements to increase gain without significantly increasing size, weight or cost. The fact that the resulting antenna is directive allows beam steering that can improve interference reduction and also minimize overall network costs by enabling ground stations to be spaced farther apart. Accordingly, for example, signal coverage may be improved with relatively low cost equipment since fewer base stations may be needed to accommodate antennas that are omni-directional, but steerable with a relatively high gain.

In one example embodiment, an antenna assembly is provided. The antenna assembly may include a plurality of antenna elements disposed in a circular pattern and equidistant from each other in angular separation relative to a common reference point at a center of the circular pattern. The antenna assembly may include or be operably coupled to a phase control module configured to apply selected phase fronts to each of the antenna elements to generate constructive and destructive interference patterns to define a directive beam in a desired direction. The selected phase fronts may include no phase adjustment, a positive phase adjustment value and a negative phase adjustment value, the positive and negative phase adjustment values each having a same magnitude.

In another example embodiment, a phase control module for control of an antenna assembly is provided. The antenna assembly may include a plurality of antenna elements disposed in a circular pattern and equidistant from each other in angular separation relative to a common reference point at a center of the circular pattern. The phase control module may include processing circuitry configured to apply selected phase fronts to each of the antenna elements to generate constructive and destructive interference patterns to define a directive beam in a desired direction. The selected phase fronts may include no phase adjustment, a positive phase adjustment value and a negative phase adjustment value, the positive and negative phase adjustment values each having a same magnitude.

In yet another example embodiment, a method of forming a directive beam may be provided. The method may include receiving an indication of a location of a ground station relative to an in-flight aircraft and determining a pointing direction for steering a directive beam toward the location. The method may further include employing a phase control module for control of an antenna assembly of an aircraft to steer the directive beam toward the location. The antenna assembly may include a plurality of antenna elements disposed in a circular pattern and equidistant from each other in angular separation relative to a common reference point at a center of the circular pattern. Employing the phase control module may include applying selected phase fronts to each of the antenna elements to generate constructive and destructive interference patterns to define the directive beam. The selected phase fronts may include no phase adjustment, a positive phase adjustment value and a negative phase adjustment value, the positive and negative phase adjustment values each having a same magnitude.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
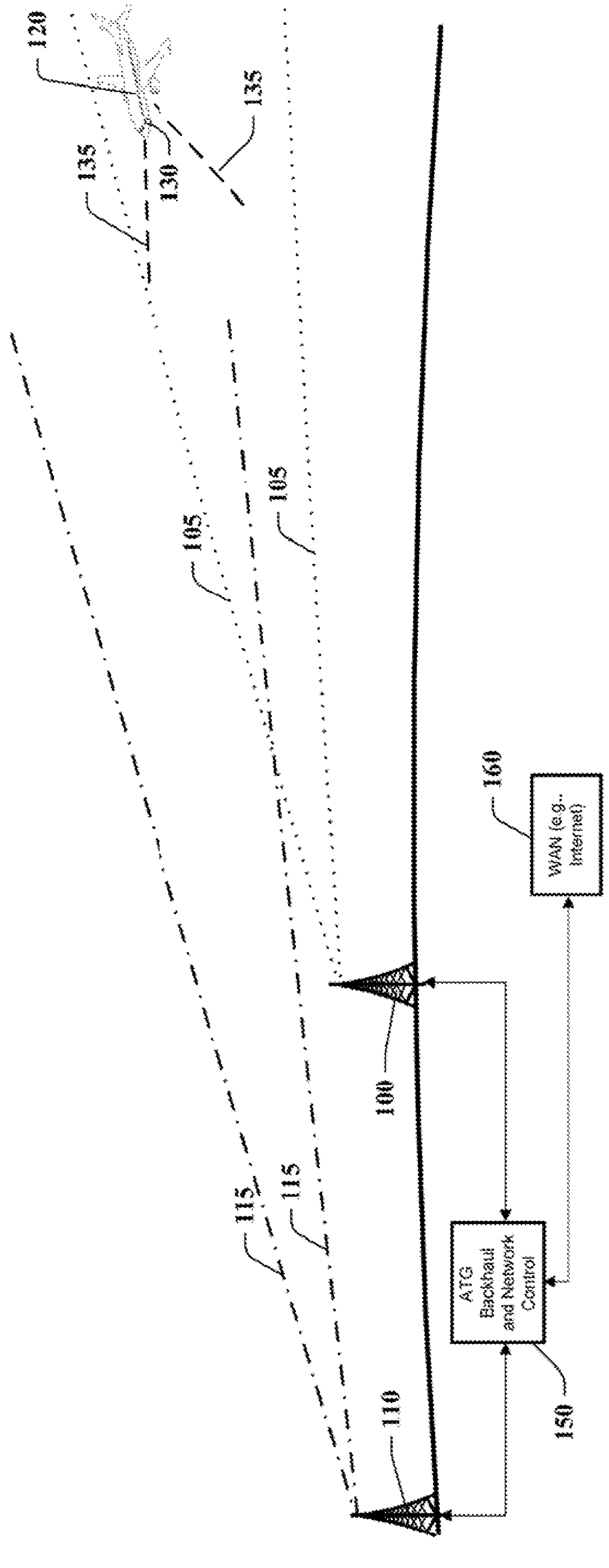
FIG. 1 illustrates a side view of a network topology of an ATG network employing aircraft with a directive antenna in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals may be used to refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide architectures for improved air-to-ground (ATG) wireless communication performance via improved antenna design. In this regard, some example embodiments may provide for an antenna design that delivers improved gain (e.g., toward the horizon) in an omni-directional, but steerable structure. The improved gain toward the horizon may enable aircraft to engage in communications with potentially distant base stations on the ground. Accordingly, an ATG network may potentially be built with base stations that are much farther apart than the typical distance between base stations in a terrestrial network while employing directivity to steer beams from the aircraft toward the ground stations.

Conventional antennas are formed by embedding conductors of structured shapes within a surrounding medium. The surrounding medium can be air or other non-conducting (insulating) media. The resulting local fields and currents in response to the differently shaped material properties and alternating currents applied to the antenna input ports determine the direction and polarization of radiated fields as well as the observed frequency dependent impedance at the antenna port. A class of antennas that is used often is that of linear antennas such as straight monopole or dipole elements. These elements are often sized such that their length is approximately ½ or ¼ of the wavelength (λ) of the resonant frequency of the antenna, and as such they become resonant. At this resonance the input impedance is purely real and the reactive component vanishes. This is convenient as the antenna can be directly connected to a transmission line and the transmission line would not carry losses due to additional reactive fields or currents.

The geometry of vertically oriented linear antenna elements, and as such their radiating currents and fields, are generally independent of the azimuth angle of observation. Furthermore, the radiated or received field intensity (or directivity) of such elements is also independent of the azimuth angle. In other words, the radiation pattern is omni-directional (in azimuth) and has a characteristic radiation pattern in the elevation angle.

These principles can be used and slightly modified to take an otherwise omni-directional antenna element, and add directivity. For example, as will be described in greater detail below, if multiple elements are fed with a signal, and the elements are spaced apart by a given distance, phase control may be employed between the different elements to either create constructive interference (thereby increasing gain) or destructive interference (thereby reducing gain) in a given direction. By controlling the application of phase over multiple elements, and multiple directions, it may be possible to effectively steer the direction of higher gain and thereby make it unnecessary to physically reorient an antenna in order to effectively steer a beam to a desired direction.

Accordingly, some example embodiments may provide an architecture that enables control to be provided to an antenna assembly to allow directivity to be achieved around a full 360 degree sweep around the antenna assembly. This architecture may be particularly useful for an aviation antenna where size, weight and cost can be very limiting. Although the structures described herein may be useful in any ATG context, they may also be useful in other networks and at devices other than aircraft. However, an example embodiment will be described in relation to a particular ATG network that advantageously employs antennas that primarily look to the horizon in order to minimize interference and extend ranges of operation. This example network should therefore be appreciated as merely a non-limiting example of one network and one network architecture inside which example embodiments may be practiced.

Accordingly, for example, an ATG network may include a plurality of base stations on the ground having antenna structures configured to generate a wedge-shaped cell inside which directional beams may be focused. The wedge shaped cells may be spaced apart from each other and arranged to overlap each other in altitude bands to provide coverage over a wide area and up to the cruising altitudes of in-flight aircraft. The wedge shaped cells may therefore form overlapping wedges that extend out toward and just above the horizon. Thus, the size of the wedge shaped cells is characterized by increasing altitude band width (or increasing vertical span in altitude) as distance from the base station increases. Meanwhile, the in-flight aircraft may employ antennas that are capable of focusing toward the horizon and just below the horizon such that the aircraft generally communicate with distant base stations instead of base stations that may be immediately below or otherwise proximal (e.g., nearest) the aircraft. In fact, for example, an aircraft directly above a base station would instead be served by a more distant base station as the aircraft antennas focus near the horizon, and the base station antennas focus above the horizon. This leaves the aircraft essentially unaffected by the communication transmitters that may be immediately below the aircraft. Thus, for example, the same RF spectrum (e.g., WiFi), and even the same specific frequencies the aircraft is using to communicate with a distally located base station may be reused by terrestrial networks immediately below the aircraft. As a result, spectrum reuse can be practiced relative to terrestrial wireless communication networks and the ATG network and the ATG network may use a same band of frequency spectrum (e.g., the unlicensed band) as the terrestrial networks without interference.

In the ATG network, beamforming may be employed to steer or form directionally focused beams to the location of the airborne assets. This further facilitates interference mitigation and increases range. However, it generally also means that the aircraft (or assets thereon) should be tracked to continuously enable beamforming to be accurately conducted to serve the aircraft (or assets thereon).

FIG. 1 illustrates an example network architecture for providing ATG communication services between at least partially overlapping cells of the ATG network. FIG. 1 shows only two dimensions (e.g., an X direction in the horizontal plane and a Z direction in the vertical plane), however it should be appreciated that the wedge architecture of the ATG network may be structured to extend coverage also in directions into and out of the page (i.e., in the Y direction). Although FIG. 1 is not drawn to scale, it should be appreciated that the wedge shaped cells generated by the base stations for the ATG network may be configured to have a much longer horizontal component than vertical component. In this regard, the wedge shaped cells may have a horizontal range on the order of dozens to nearly or more than 100 miles. Meanwhile, the vertical component expands with distance from the base stations, but is in any case typically less than about 8 miles (e.g., about 45,000 ft).

As shown in FIG. 1, a first ATG base station 100 and a second ATG base station 110, which are examples of base stations employed in the ATG network as described above (e.g., employing wedge shaped cells) may be operating in a particular geographic area. The first ATG base station 100 may be deployed substantially in-line with the second ATG base station 110 along the X axis and may generate a first wedge shaped cell (defined between boundaries 105) that may be layered on top of a second wedge shaped cell (defined between boundaries 115) generated by the second ATG base station 110. When an in-flight aircraft 120 is exclusively in the first wedge shaped cell, the aircraft 120 (or wireless communication assets thereon) may communicate with the first ATG base station 100 using assigned RF spectrum (e.g., unlicensed spectrum) and when the aircraft 120 is exclusively in the second wedge shaped cell, the aircraft 120 (or wireless communication assets thereon) may communicate with the second ATG base station 110 using the assigned RF spectrum. The communication may be accomplished using beamforming to form or steer a beam toward the aircraft 120 within either the first or second wedge shaped cell based on knowledge of the location of the aircraft 120.

The aircraft 120 (or wireless communication assets thereon) may employ a radio and antenna assembly 130 configured to interface with the first and second ATG base stations 100 and 110 of the ATG network (and any other ATG base stations of the ATG network). The antenna assembly 130 may also be configured to be directed generally toward the horizon with steerable beams directed toward the first and second ATG base stations 100 and 110. In this regard, the antenna assembly 130 may be configured to generate a directive radiation pattern (defined between boundaries 135).

An area of overlap between the first wedge shaped cell and the second wedge shaped cell may provide the opportunity for handover of the in-flight aircraft 120 between the first ATG base station 100 and the second ATG base station 110, respectively. Beamforming may thus be used by each of the first and second base stations 100 and 110 to steer or form respective beams for conduct of the handover. Meanwhile, the antenna assembly 130 on the aircraft 120 may also be configured to form directive beams toward the first or second base stations 100 and 110 to ensure connectivity is maintained as the aircraft 120 moves and changes its relative location with respect to either of the first or second base stations 100 and 110. Accordingly, uninterrupted handover of receivers on the in-flight aircraft 120 may be provided while passing between coverage areas of base stations of the ATG network having overlapping coverage areas as described herein.

In an example embodiment, the ATG network may include ATG backhaul and network control components 150 that may be operably coupled to the first and second ATG base stations 100 and 110. The ATG backhaul and network control components 150 may generally control allocation of the assigned RF spectrum and system resources of the ATG network. The ATG backhaul and network control components 150 may also provide routing and control services to enable the aircraft 120 and any UEs and other wireless communication devices thereon (i.e., wireless communication assets on the aircraft 120) to communicate with each other and/or with a wide area network (WAN) 160 such as the Internet.

Given the curvature of the earth and the distances between base stations of the ATG network may be enhanced. Additionally, the base stations of the ATG network and the antenna assembly 130 of the aircraft 120 may be configured to communicate with each other using relatively small, directed beams that are generated using beamforming techniques, as mentioned above. The beamforming techniques employed may include the generation of relatively narrow and focused beams. Thus, the generation of side lobes (e.g., radiation emissions in directions other than in the direction of the main beam) that may cause interference may be reduced. However, using these relatively narrow and focused beams generally requires some accuracy with respect to aiming or selection of such beams in order to make the beams locate and track the position of the aircraft 120.

Figure 2:
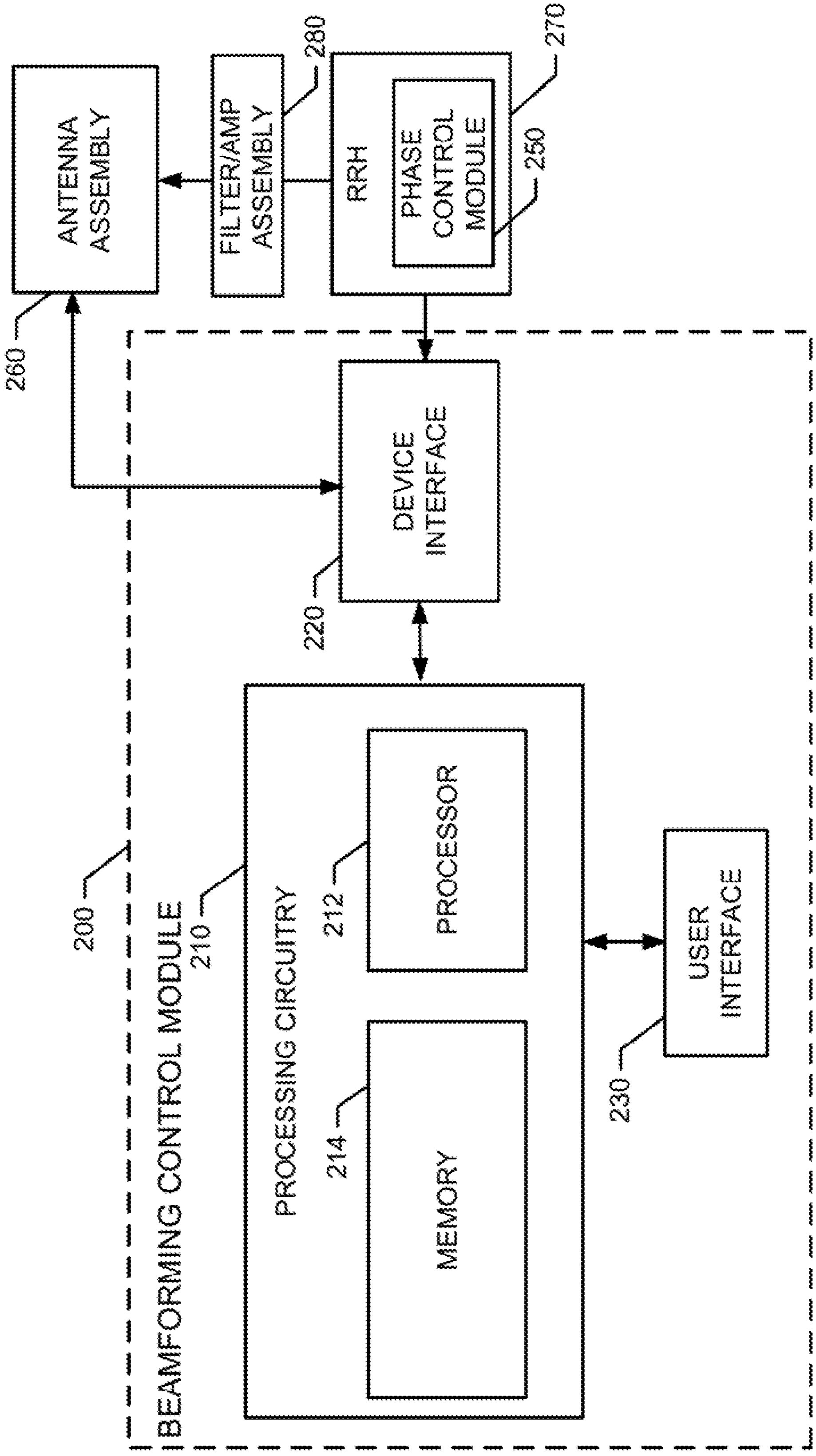
FIG. 2 illustrates a functional block diagram of a beam-forming control module of an example embodiment.

In an example embodiment, beamforming control modules may be employed at radios or radio control circuitry of either or both of the aircraft 120 and the base stations of the ATG network. These beamforming control modules may use location information provided by components of the respective devices to direct beamforming to the location of the aircraft 120 or the base stations, respectively. FIG. 2 illustrates a block diagram of a beamforming control module 200 in accordance with an example embodiment. As shown in FIG. 2, the beamforming control module 200 may include processing circuitry 210 configured to manage the use of aircraft location/position information for conducting beamforming as described herein.

The processing circuitry 210 may be configured to perform data processing, control function execution and/or other processing and management services according to an example embodiment of the present invention. In some embodiments, the processing circuitry 210 may be embodied as a chip or chip set. In other words, the processing circuitry 210 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 210 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 210 may include one or more instances of a processor 212 and memory 214 that may be in communication with or otherwise control a device interface 220 and, in some cases, a user interface 230 (which may be optional). As such, the processing circuitry 210 may be embodied as a circuit chip (e.g., an integrated circuit chip) configured (e.g., with hardware, software or a combination of hardware and software) to perform operations described herein. In some embodiments, the processing circuitry 210 may be embodied as a portion of a computer located in the core of the ATG network, or at a central location accessible to the ATG network. However, in other embodiments (e.g., when the beamforming control module 200 is located on the aircraft 120), the processing circuitry 210 may be part of the electronics of the aircraft 120 or a separate instance of circuitry otherwise disposed at the aircraft 120. In some embodiments, the processing circuitry 210 may communicate with various components, entities and/or sensors of the aircraft 120, or of the network to receive information used to determine where to point a beam. Thus, for example, the processing circuitry 210 may communicate with a sensor network of the aircraft 120, or other entities of the network to make determinations regarding where to point antenna beams.

The device interface 220 may include one or more interface mechanisms for enabling communication with other devices (e.g., base stations, modules, entities, sensors and/or other components of the aircraft 120 or the ATG network). In some cases, the device interface 220 may be any means such as a device or circuitry embodied in either hardware, or a combination of hardware and software that is configured to receive and/or transmit data from/to aircraft, base stations, modules, entities, sensors and/or other components of the ATG network that are in communication with the processing circuitry 210.

The processor 212 may be embodied in a number of different ways. For example, the processor 212 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 212 may be configured to execute instructions stored in the memory 214 or otherwise accessible to the processor 212. As such, whether configured by hardware or by a combination of hardware and software, the processor 212 may represent an entity (e.g., physically embodied in circuitry—in the form of processing circuitry 210) capable of performing operations according to embodiments of the present invention while configured accordingly. Thus, for example, when the processor 212 is embodied as an ASIC, FPGA or the like, the processor 212 may be specifically configured hardware for conducting the operations described herein. Alternatively, as another example, when the processor 212 is embodied as an executor of software instructions, the instructions may specifically configure the processor 212 to perform the operations described herein.

In an example embodiment, the processor 212 (or the processing circuitry 210) may be embodied as, include or otherwise control the operation of the beamforming control module 200 based on inputs received by the processing circuitry 210 indicative of the position/location of the aircraft 120 or base stations (and/or future positions of the aircraft 120 or base stations at a given time). As such, in some embodiments, the processor 212 (or the processing circuitry 210) may be said to cause each of the operations described in connection with the beamforming control module 200 in relation to processing location information for beam forming decisions based on execution of instructions or algorithms configuring the processor 212 (or processing circuitry 210) accordingly. In particular, the instructions may include instructions for determining that it is desirable to initiate formation of a beam in a particular direction and control of various components configured to control formation of the same.

In an exemplary embodiment, the memory 214 may include one or more non-transitory memory devices such as, for example, volatile and/or non-volatile memory that may be either fixed or removable. The memory 214 may be configured to store information, data, applications, instructions or the like for enabling the processing circuitry 210 to carry out various functions in accordance with exemplary embodiments of the present invention. For example, the memory 214 could be configured to buffer input data for processing by the processor 212. Additionally or alternatively, the memory 214 could be configured to store instructions for execution by the processor 212. As yet another alternative, the memory 214 may include one or more databases that may store a variety of data sets responsive to input from sensors and network components. Among the contents of the memory 214, applications and/or instructions may be stored for execution by the processor 212 in order to carry out the functionality associated with each respective application/instruction. In some cases, the applications may include instructions for directing formation of a steerable beam (or steering of a formed beam) in a particular direction as described herein. In an example embodiment, the memory 214 may store static and/or dynamic position information indicative of a location of the aircraft 120 or base station (e.g., now and in the future) for use in beamforming. The memory 214 may also or alternatively store parameters or other criteria that, when met, may trigger the execution of beam formation/steering and/or the manipulation of various components that are used for the same. Moreover, in some cases, the memory 214 may store a table of phase angles and differences that are to be used relative to driving various portions (or antenna elements) of antenna assembly 260 to achieve directionality to corresponding relative positions about the antenna assembly 260.

In an example embodiment, the beamforming control module 200 may include or otherwise control a phase control module 250. As such, in some cases, the processing circuitry 210 may also control the phase control module 250. In an example embodiment, the phase control module 250 may operate as a programmed module of the processing circuitry 210, but in other cases, the phase control module 250 may be a separate module (e.g., a separate ASIC or FPGA) having its own processing circuitry (which may be similar in form and/or function to the processing circuitry 210) configured to operate as described herein. In particular, the phase control module 250 may be configured to apply signal to respective selected antenna elements of the antenna assembly 260 with different phases to generate constructive/destructive interference patterns that generate a desired resultant beam as described herein.

The phase control module 250 may be configured to interface with an antenna assembly 260 (which may be an example of antenna assembly 130 of the aircraft 120, or an antenna of a base station). In particular, the phase control module 250 may interface with the antenna assembly 260 to select specific elements of the antenna assembly 260 that are to be driven with corresponding phasing to accomplish beam formation to form or steer a beam. In this regard, for example, the antenna assembly 260 may include a number of antenna elements that can be controlled by the phase control module 250 to effectively control the direction in which the antenna assembly 260 forms a receive or transmit beam. Accordingly, the structure of the antenna assembly 260 and the antenna elements therein may influence the operational requirements on the phase control module 250.

Of note, although the example of FIG. 2 illustrates the phase control module 250 as being separate from the beamforming control module 200, the phase control module 250 could instead part of the beamforming control module 200. Moreover, in some cases, the phase control module 250 may be a portion of the antenna assembly 260, or disposed between the beamforming control module 200 and the antenna assembly 260 (i.e., as part of the remote radio head). In any case, the phase control module 250 may be operably coupled to each of the beamforming control module 200 and the antenna assembly 260 to enable radio control signals to be used to influence directivity of a resulting antenna as described herein. By changing the phasing of signal applied to the antenna elements, beam steering can be accomplished as described herein.

In some cases, a remote radio head (RRH) 270 may be disposed between the beamforming control module 200 and the antenna assembly. The RRH 270 may include RF circuitry and analog-to-digital and/or digital-to-analog converters. The RRH 270 may also include up/down converters and have operational and management capabilities (e.g., relating to directive beam formation). As such, for example, the phase control module 250 may, in some cases, be a part of the RRH 270, as shown in FIG. 2. In example embodiment, the RRH 270 further includes a high-frequency transmitter, and the RRH 270 is provided proximate to the antenna assembly 260. However, in some cases, a filter/amplifier assembly 280 may be provided as part of the RRH 270 or otherwise between the RRH 270 and the antenna assembly 260. The filter/amplifier assembly 280 may include a ceramic filter for each antenna element, and may include low noise amplifiers (LNAs) and/or other power amplifiers (PAs) operably coupled to each of the ports associated with each respective one of the antenna elements 310 described in greater detail below.

Figure 3:
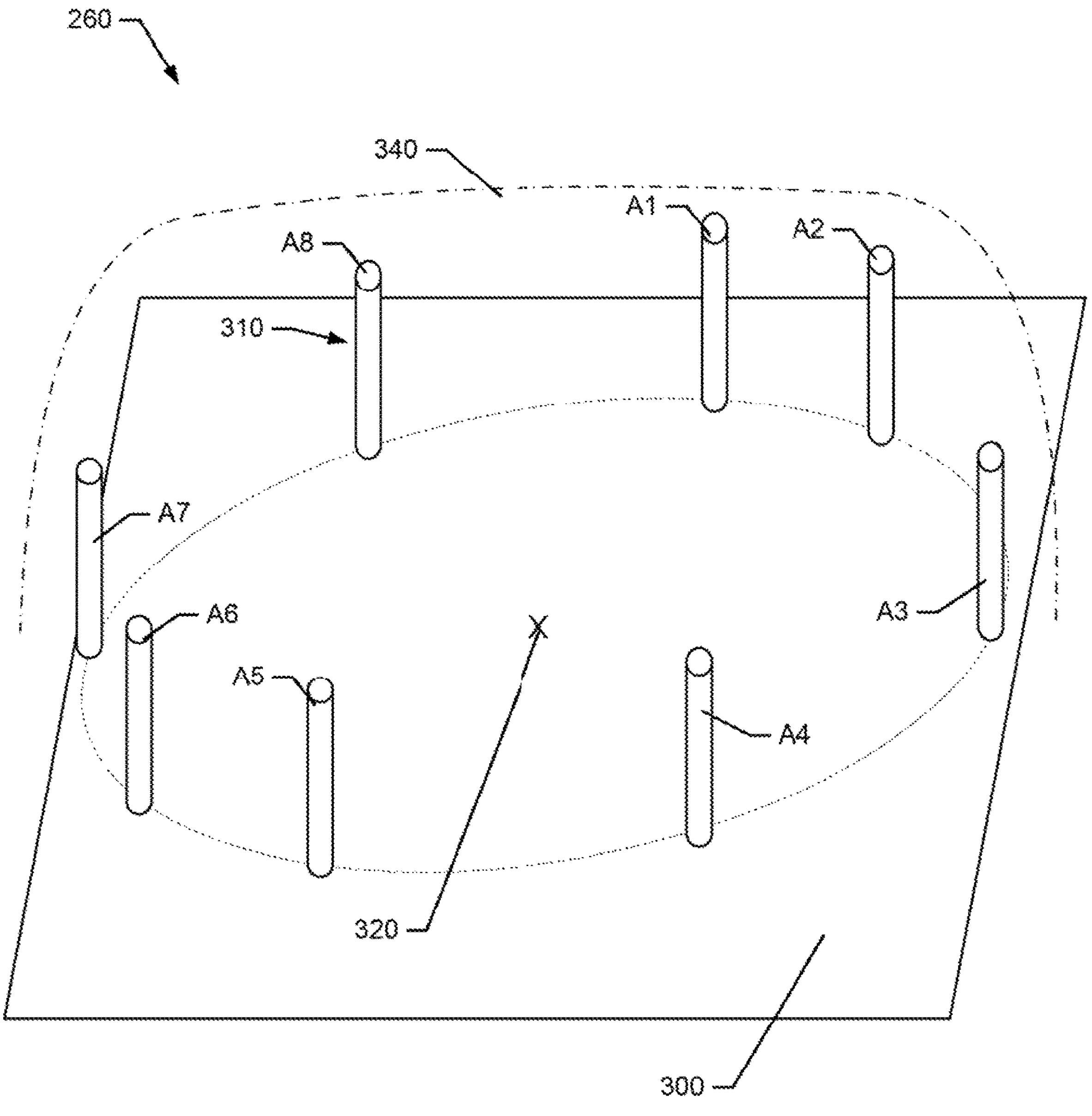
FIG. 3 illustrates a perspective view of antenna elements of an antenna assembly in accordance with an example embodiment.

FIG. 3 illustrates a plan view of the antenna assembly 260 of an example embodiment to facilitate an explanation of how the phase control module 250 of an example embodiment may function. In this regard, the antenna assembly 260 may for formed at or otherwise operably coupled to a ground plane 300. The ground plane 300 could be a surface of an aircraft (e.g., aircraft 120) or a surface of some other media that may be attached to an aircraft or a base station. A plurality of monopole antenna elements 310 may be disposed on the ground plane 300 in a particular pattern as shown in FIG. 3. In this regard, for example, the antenna elements 310 may be provided to be equidistant from a center of the antenna assembly 260. Each of the antenna elements 310 may extend substantially perpendicularly away from the ground plane 300 and may be connected to radio circuitry configured for transmit/receive functions to provide signals for transmission to, or receive signals from reception at, the antenna elements 310. In some cases, the antenna elements 310 may have a length selected to be about a quarter wavelength for the frequency of operation of the radio circuitry.

The antenna elements 310 may be disposed to be spaced apart from each other at fixed intervals, while also being equidistant from a common reference point 320. Thus, the antenna elements 310 may be disposed in a circular pattern where each of the antenna elements 310 is located on the circle about the common reference point 320. In this regard, for example, a first antenna element (A1) may be disposed at a first radial distance from the common reference point 320, and the second antenna element (A2) may be disposed at the first radial distance from the common reference point 320 as well. Each of the other antenna elements including a third antenna element (A3), a fourth antenna element (A4), a fifth antenna element (A5), a sixth antenna element (A6), a seventh antenna element (A7) and an eight antenna element (A8) may also be disposed at the first radial distance from the common reference point 320. The first radial distance may be selected to be about a quarter wavelength in some cases. All of the antenna elements 310 may therefore be disposed equidistant from the common reference point 320 and from each adjacent antenna element so that, for example, the angular separation between each of the antenna elements 310 is equal. Accordingly, given that there are eight total antenna elements 310 in this example, each antenna element may be separated from its adjacent antenna elements by 45 degrees (i.e., 360/8) of angular separation. If more or less antenna elements are used to form the antenna assembly 260 in alternative embodiments, the angular separation would be determined by dividing 360 degrees by the number of antenna elements.

In an example embodiment, a radome 340 may be disposed over all of the antenna elements 310. The radome 340 may be used to improve aerodynamic characteristics of the antenna assembly 260 for use on the aircraft 120. However, even if used on the ground, the radome 240 may generally protect the antenna elements 310 from the weather and/or debris, etc.

In an example embodiment, as mentioned above, each of the antenna elements 310 may be positioned 45 degrees from each adjacent antenna element. As such, for example, if the first antenna element (A1) may be positioned at a reference position of zero degrees, then the second antenna element (A2) would be positioned at 45 degrees and the third antenna element (A3) would be positioned at 90 degrees. This pattern may continue such that the fourth antenna element (A4) is at 135 degrees, the fifth antenna element (A5) is at 180 degrees, the sixth antenna element (A6) is at 225 degrees, the seventh antenna element (A7) is at 270 degrees, and the eighth antenna element (A8) is at 315 degrees relative to the reference position.

The alignment described above may enable the phase control module 250 to select a combination of phase front control inputs to be applied to the antenna elements 310 to steer a beam centered at the reference point of 0 degrees. Similarly, the phase control module 250 may be configured to select a different combination of phase front control inputs to steer a beam centered at an area 180 degrees away from the reference position, or any other desired position. The manner of this selection will be described in greater detail below in reference to FIG. 4.

Figure 4:
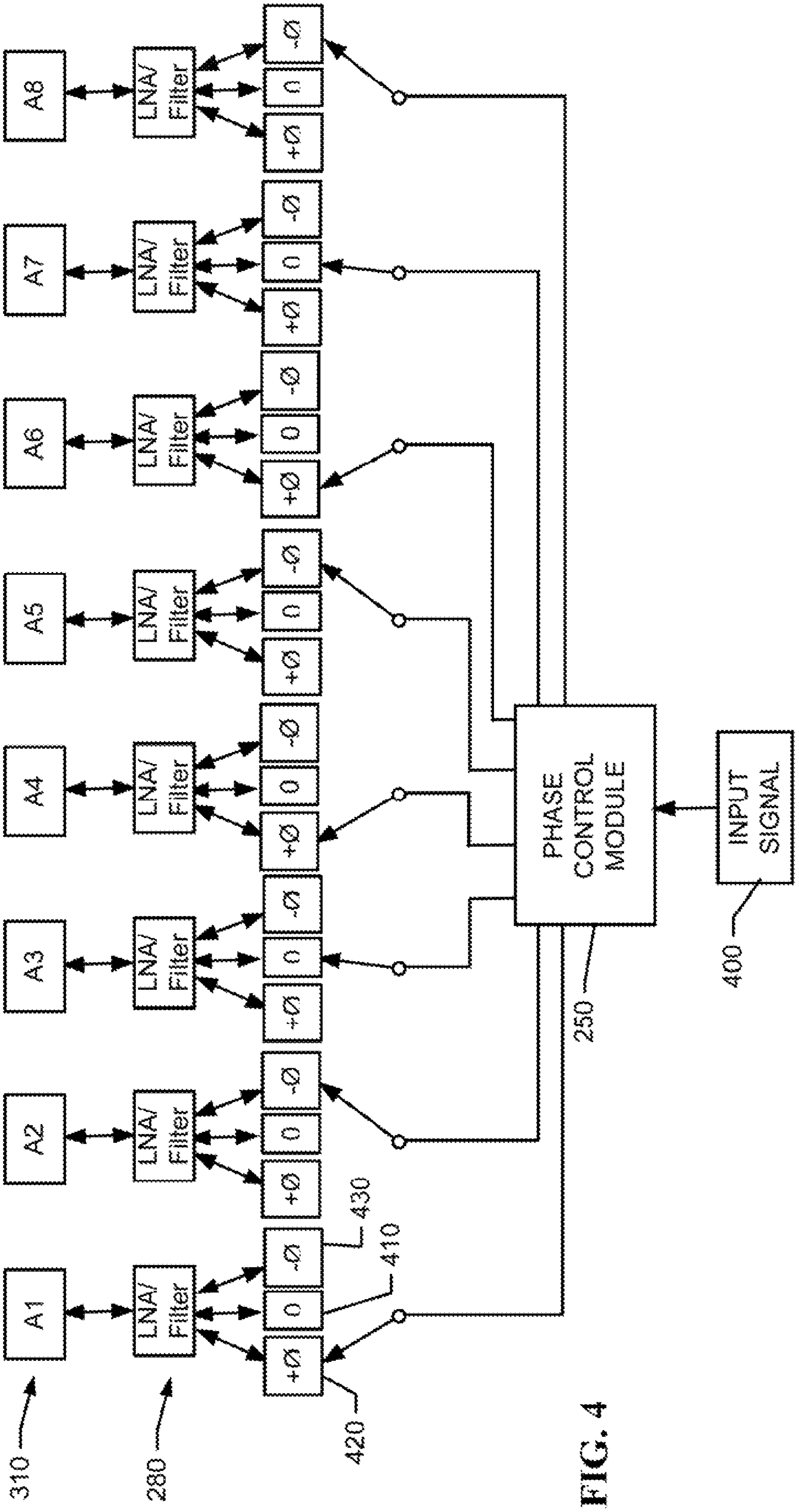
FIG. 4 illustrates a phase control module in accordance with an example embodiment.

FIG. 4 illustrates a conceptual block diagram of one example architecture for circuitry by which the phase control module 250 may implement selection of any of the combinations of phase front control inputs described above.

In this regard, for example, the phase control module 250 may be configured to receive an input signal 400 that is to be transmitted in a particular direction. Of course, it should be appreciated that the phase control module 250 can be operated for receive signals as well in similar fashion based on the property of reciprocity associated with antennas. Regardless, in this example, the phase control module 250 may be configured to, based on the particular direction, determine the phase front control inputs that will create constructive and destructive interference patterns that produce a resultant beam directed toward the particular direction. The phase front control inputs may select to apply either no phase adjustment to the input signal (e.g., via a zero phase adjustment option 410), or to apply a phase adjustment. In some cases, the amount of phase adjustment may be constant and may be determined based on the geometry of the antenna elements 310 of the antenna assembly 260. Thus, a fixed value of a first phase adjuster 420 may apply a phase adjustment to the input signal if selected by the phase control module 250. The fixed value may then be inverted (e.g., via a phase inverter) to apply a negative or inverted phase of the same fixed value. As such, while FIG. 4 illustrates a second phase adjuster 430 that is configured to apply an inverted phase of the same fixed value as the first phase adjuster 420, it should be appreciated that the second phase adjuster 430 could be embodied as the first phase adjuster 420 and a phase inverter instead of as a completely separate phase adjuster. However, it is also possible to use a separate phase adjuster that is configured to apply a negative version of the fixed value in some cases.

Regardless of how the fixed value of phase adjustment, and its inverted value of phase adjustment, can be created, the phase control module 250 may be configured to apply the corresponding adjustments (e.g., zero phase adjustment, a positive phase adjustment, or a negative phase adjustment) to the input signal 400 before the adjusted signals are applied through the LNA/filtering components of the filter/amplifier assembly 280 and then communicated to respective ones of the antenna elements 310. The selections shown in FIG. 4 may drive the antenna assembly 260 in the manner shown in FIG. 5.

Figure 5:
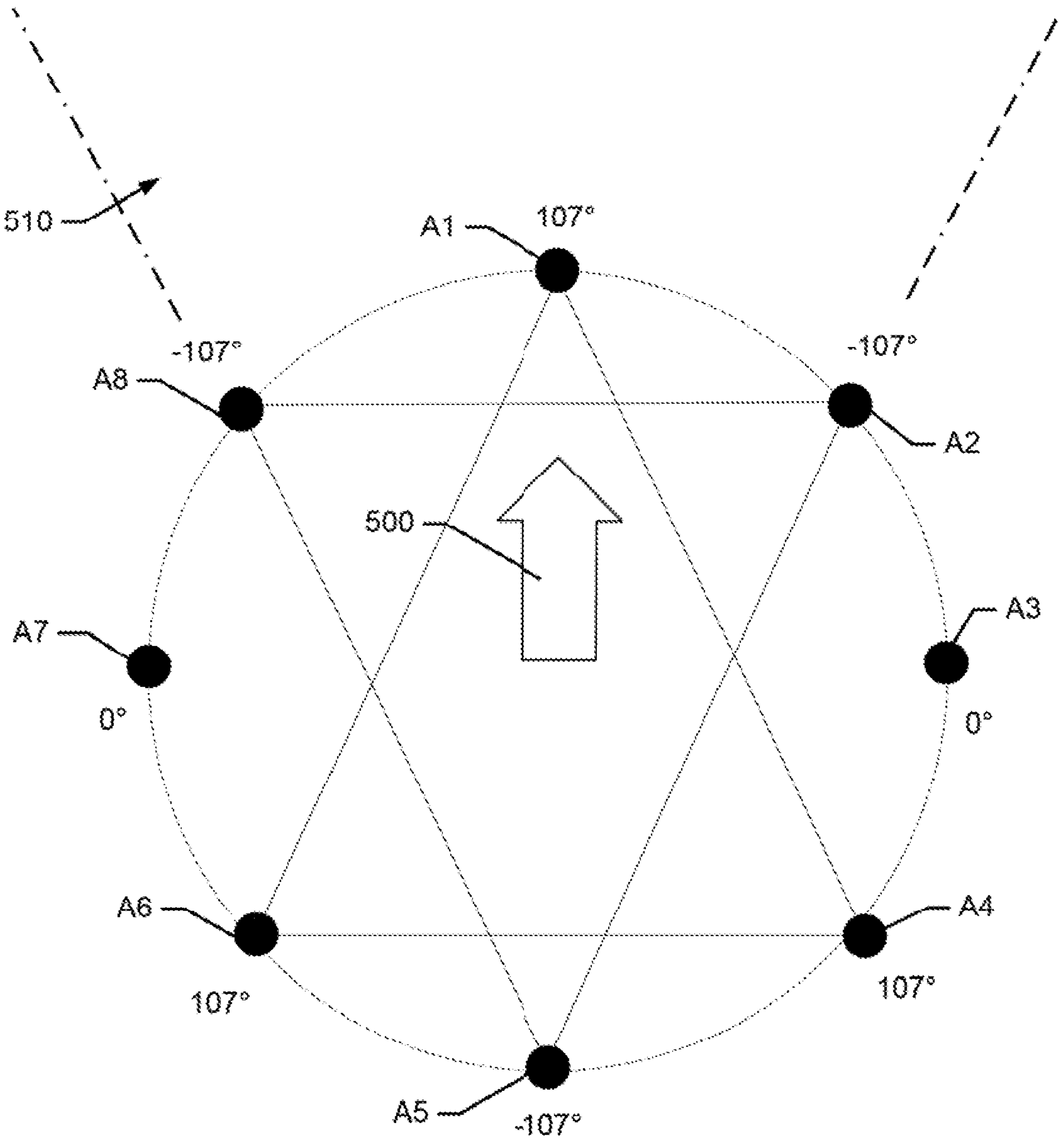
FIG. 5 illustrates the antenna assembly of FIG. 3 arranged for beam formation in accordance with an example embodiment.

In this regard, for example, FIG. 5 illustrates a top view looking directly down onto the antenna assembly 260 from above. In this example, the seventh antenna element (A7) and the third antenna element (A3) are each driven with signal that has no phase adjustment. Meanwhile, the first antenna element (A1), the fourth antenna element (A4) and the sixth antenna element (A6) are each driven with a phase adjustment of about 107°. The phase fronts generated by this arrangement tend to constructively interfere with the signal provided to the seventh antenna element (A7) and the third antenna element (A3) with no phase adjustment in a direction shown by arrow 500. Meanwhile, the second antenna element (A2), the fifth antenna element (A5) and the eighth antenna element (A8) are each driven with a phase adjustment of about −107°. The phase fronts generated by this arrangement tend to destructively interfere with the signal provided to the seventh antenna element (A7) and the third antenna element (A3) with no phase adjustment in a direction opposite the direction shown by arrow 500. Accordingly, as a result of the constructive and destructive interference created, a resultant directive beam 510 may be formed in the direction of arrow 500. Arrow 500 therefore illustrates a direction of the central axis of the resultant directive beam 510. For a receive signal, the same phase adjustments may be made, but to a received signal instead of to an input signal that is to be transmitted.

Figure 6:
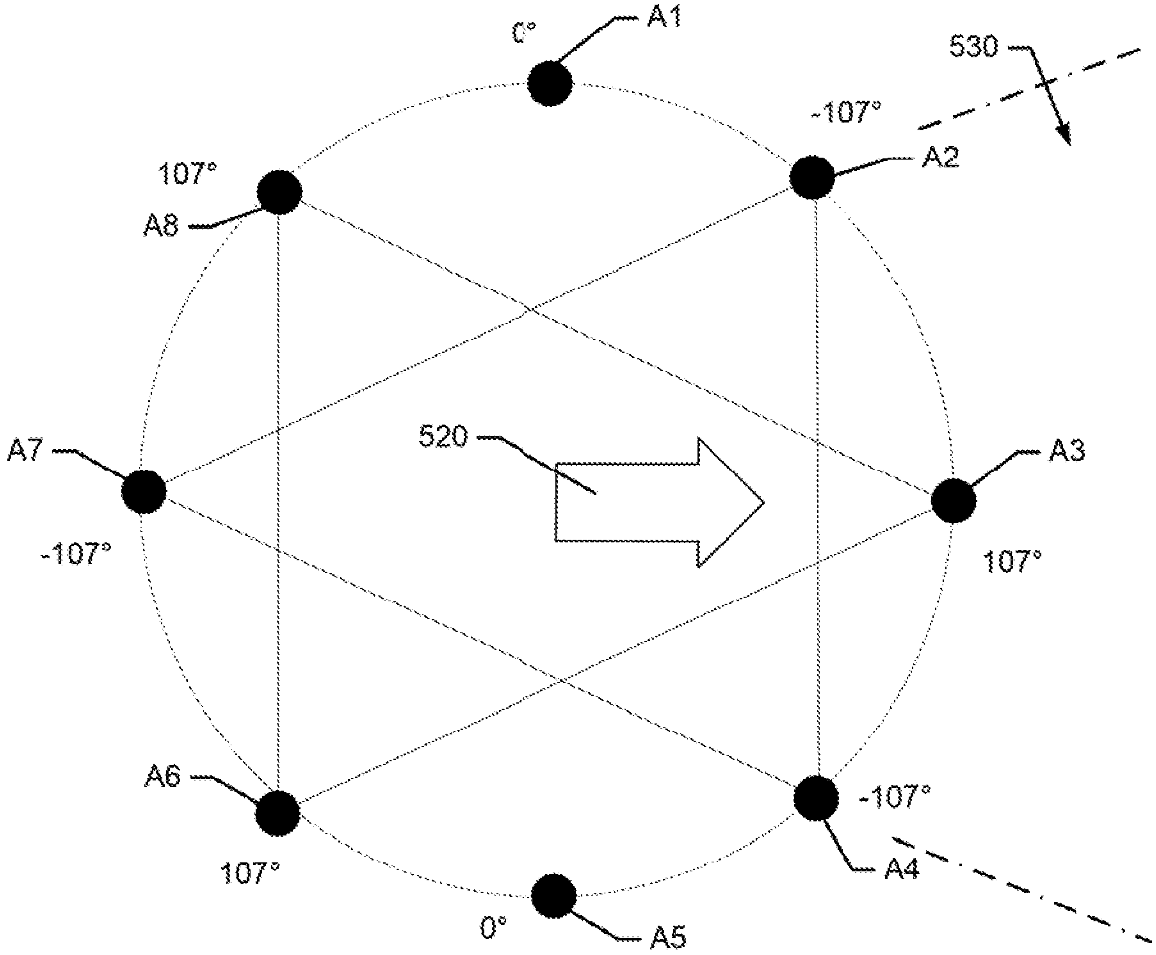
FIG. 6 illustrates the antenna assembly of FIG. 3 arranged for an alternative beam formation in accordance with an example embodiment.

FIG. 6 illustrates a diagram of an alternative driving pattern for the antenna assembly 260 in accordance with an example embodiment. In this example, the first antenna element (A1) and the fifth antenna element (A5) are each driven with signal that has no phase adjustment. Meanwhile, the third antenna element (A3), the sixth antenna element (A6) and the eighth antenna element (A8) are each driven with a phase adjustment of about 107°. The phase fronts generated by this arrangement tend to constructively interfere with the signal provided to the first antenna element (A1) and the fifth antenna element (A5) with no phase adjustment in a direction shown by arrow 520. Meanwhile, the second antenna element (A2), the fourth antenna element (A4) and the seventh antenna element (A7) are each driven with a phase adjustment of about −107°. The phase fronts generated by this arrangement tend to destructively interfere with the signal provided to the first antenna element (A1) and the fifth antenna element (A5) with no phase adjustment in a direction opposite the direction shown by arrow 520. Accordingly, as a result of the constructive and destructive interference created, a resultant directive beam 530 may be formed in the direction of arrow 520. Arrow 520 therefore illustrates a direction of the central axis of the resultant directive beam 530. For a receive signal, the same phase adjustments may be made, but to a received signal instead of to an input signal that is to be transmitted.

In an example embodiment in which the antenna assembly 260 is configured to operate in the unlicensed band (e.g., 2.4 GHz), the lengths of the antenna elements 310 may be less than about 1.5 inches. Given that the distance of each of the antenna elements 310 from the common reference point 320 is fixed, and may also be about ¼ wavelength (or less than about 1.5 inches), the height of the radome 340 off the ground plane 300 may be less than 2 inches, and the overall diameter of the radome 340 may also be less than about 3.5 inches. However, other dimensions are possible for other frequencies of operation. For example, a 5 GHz signal may be used with elements having about ½ of the dimensions noted above.

In the examples described above, the antenna assembly 260 generates a resultant directive beam oriented in a direction determined by the phase front control inputs provided by the phase control module 250. Of note, each of the resultant directive beams may have a substantially fixed and similar elevation that extends substantially away from the antenna assembly 260 perpendicular to the direction of extension of the elements. The ground plane 300 may limit the beam width elevation, so the beam width may extend substantially away from the ground plane 300 by some amount. In an example embodiment, the width of the beam in altitude or elevation may be about 26 degrees, as measured at the half power points (−3 dB) from the main lobe that is oriented in the direction of the arrows 500 and 520 for a situation where the ground plane 300 is about four feet in diameter. Meanwhile, the width of the beam in azimuth may be about 50 degrees, as measured at the half power points (−3 dB). The use of eight antenna elements, as described in FIGS. 3-6 may enable the steering of 8 individual resultant directive beams, each centered at about 45 degrees of angular separation apart from an adjacent beam. Although the beam width in elevation remains fixed (e.g., at about 26 degrees) and there is no steering in elevation, the beams can be steered fully 360 degrees around the antenna elements 310 (in the manner described above) in azimuth.

Accordingly, example embodiments may achieve a full 360 degree coverage (in transmit and receive mode) for beam steering in azimuth using eight antenna elements that require no remote power, and only passive RF filters. The RRH 270 of some example embodiments may handle digital beam forming, and the RRH 270 may require power, control and data lines from the beamforming control module 200, but all such lines need not be extended to the antenna assembly 260. Instead, only the data lines need extend to the antenna assembly 260 via the filter/amplifier assembly 280 based on the adjustments made by the phase control module 250.

Some example embodiments, while operating at unlicensed band frequencies (e.g., 2.4 GHz), may achieve a peak gain of about 10 dB, with minimum gain over the width of the beam of about 7 to 8 dB. Side-lobe characteristic patterns from the peak have been measured at −29 dB in azimuth and −12 dB in elevation. Accordingly, example embodiments provide a radio capable of digital beamforming, which can provide dual polarization in accordance with design objectives. Thus, for example, if the ground plane 300 is formed at a surface of the underneath portion of a wing or fuselage of the aircraft 120, the vertical beam elevation may essentially point toward within 22 degrees of the horizon. As noted above, this may reduce interference with transmitters immediately below the aircraft 120, and may therefore be advantageous within an ATG network context.

In accordance with an example embodiment, a directive antenna assembly may be provided. The antenna assembly may include a plurality of antenna elements disposed in a circular pattern and equidistant from each other in angular separation relative to a common reference point at a center of the circular pattern. The antenna assembly may include or be operably coupled to a phase control module configured to apply selected phase fronts to each of the antenna elements to generate constructive and destructive interference patterns to define a directive beam in a desired direction. The selected phase fronts may include no phase adjustment, a positive phase adjustment value and a negative phase adjustment value, the positive and negative phase adjustment values each having a same magnitude.

The antenna assembly described above may include additional features, modifications, augmentations and/or the like in some cases. Such features, modifications, or augmentations may be optional, and may be combined in any order or combination. For example, in some cases, a number of the antenna elements is eight and the angular separation is 45 degrees. In an example embodiment, the antenna elements may each be disposed a distance about equal to a quarter wavelength of a frequency of operation of the antenna assembly away from a common reference point at a center of the circular pattern. In some cases, the positive phase adjustment value may be 107° and the negative phase adjustment value may be −107°. In an example embodiment, the antenna assembly may further include a ground plane at which the antenna elements are mounted such that the antenna elements each extend substantially perpendicularly away from the ground plane and parallel to each other. In some cases the ground plane may be formed at the physical interface of an aircraft wing or fuselage (e.g., at an underside of the wing or fuselage). In an example embodiment, a radome may house the antenna elements, and the radome may be operably coupled to the aircraft wing or fuselage. In some cases, the radome may have a diameter of less than about 3.5 inches and a height of less than about 2 inches, and wherein the ground plane is at least 4 feet in diameter. In an example embodiment, the phase control module may be disposed at a remote radio head provided between the antenna assembly and a beamforming control module. The beamforming control module may be configured to provide instructions to the phase control module for generating the selected phase fronts. In some cases, the phase control module may be configured to apply no phase adjustment to antenna elements disposed such that a radius from a center of the circular pattern is substantially perpendicular to a direction of a central axis of a resultant directive beam formed by the antenna assembly. The positive phase adjustment value may be applied at least to an antenna element having a radius from the center extending in the direction of the central axis of the resultant directive beam. The negative phase adjustment value may be applied at least to an antenna element having a radius from the center extending opposite the direction of the central axis of the resultant directive beam. In an example embodiment, responsive to operation of the phase control module, the antenna assembly may be configurable to steer a directive beam 360 degrees in azimuth with a fixed beamwidth in elevation. In some cases, the antenna assembly may be configured to be disposed on an aircraft, and wherein the fixed beamwidth in elevation is directed toward the horizon.

Figure 7:
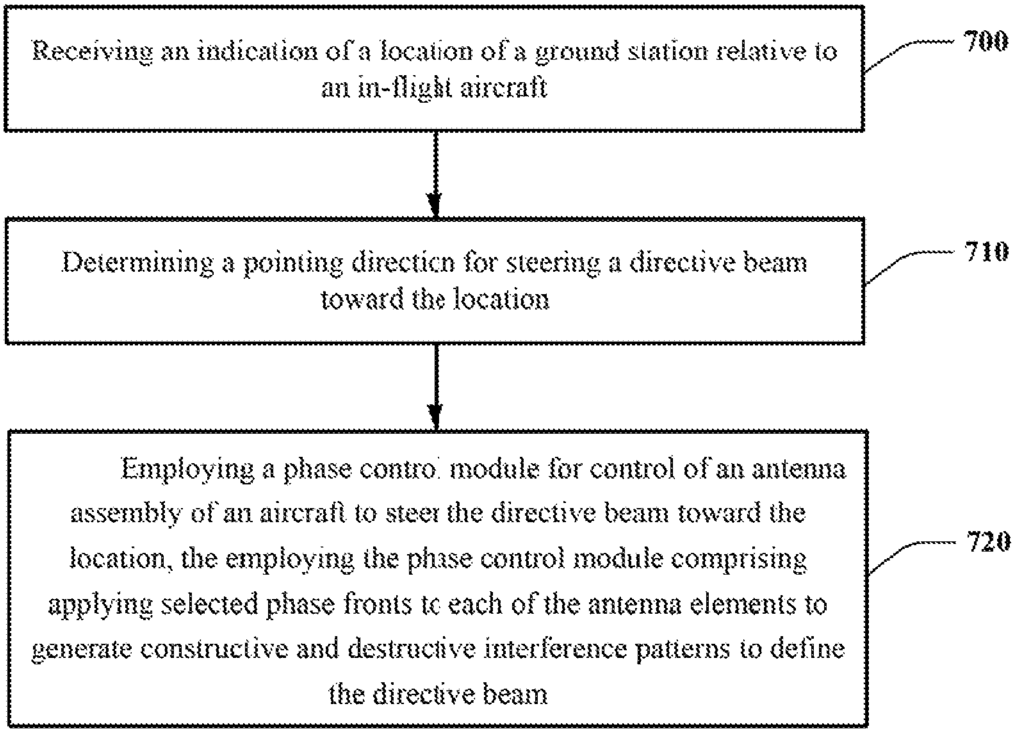
FIG. 7 illustrates a block diagram of a method of forming a directive beam in accordance with an example embodiment.

FIG. 7 illustrates a block diagram of one method that may be associated with an example embodiment as described above. From a technical perspective, the processing circuitry 210 described above may be used to support some or all of the operations described in FIG. 7. As such, FIG. 7 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a device (e.g., the beamforming control module 200, and/or the like) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 7, may include receiving an indication of a location of a ground station relative to an in-flight aircraft at operation 700 and determining a pointing direction for steering a directive beam toward the location at operation 710. The method may further include employing a phase control module for control of an antenna assembly of an aircraft to steer the directive beam toward the location at operation 720. The antenna assembly may include a plurality of antenna elements disposed in a circular pattern and equidistant from each other in angular separation relative to a common reference point at a center of the circular pattern. Employing the phase control module may include applying selected phase fronts to each of the antenna elements to generate constructive and destructive interference patterns to define the directive beam. The selected phase fronts may include no phase adjustment, a positive phase adjustment value and a negative phase adjustment value, the positive and negative phase adjustment values each having a same magnitude.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An antenna assembly comprising:

a plurality of antenna elements disposed in a circular pattern and equidistant from each other in angular separation relative to a common reference point at a center of the circular pattern, wherein the antenna assembly includes or is operably coupled to a phase control module configured to apply selected phase fronts to each of the antenna elements to generate constructive and destructive interference patterns to define a directive beam in a desired direction, wherein the selected phase fronts include no phase adjustment, a positive phase adjustment value and a negative phase adjustment value, the positive and negative phase adjustment values each having a same magnitude, wherein a number of the antenna elements is eight and the angular separation is 45 degrees, wherein the antenna elements are each disposed a distance about equal to a quarter wavelength of a frequency of operation of the antenna assembly away from a common reference point at a center of the circular pattern, and wherein the positive phase adjustment value is 107° and the negative phase adjustment value is −107°.

2. The antenna assembly of claim 1, further comprising a ground plane at which the antenna elements are mounted such that the antenna elements each extend substantially perpendicularly away from the ground plane and parallel to each other.

3. An antenna assembly comprising:

a plurality of antenna elements disposed in a circular pattern and equidistant from each other in angular separation relative to a common reference point at a center of the circular pattern; and a ground plane at which the antenna elements are mounted such that the antenna elements each extend substantially perpendicularly away from the ground plane and parallel to each other, wherein the antenna assembly includes or is operably coupled to a phase control module configured to apply selected phase fronts to each of the antenna elements to generate constructive and destructive interference patterns to define a directive beam in a desired direction, wherein the selected phase fronts include no phase adjustment, a positive phase adjustment value and a negative phase adjustment value, the positive and negative phase adjustment values each having a same magnitude, and wherein the ground plane is formed at a physical interface to an aircraft wing or fuselage.

4. The antenna assembly of claim 3, wherein a radome houses the antenna elements, the radome being operably coupled to the aircraft wing or fuselage.

5. The antenna assembly of claim 4, wherein the radome has a diameter of less than about 3.5 inches and a height of less than about 2 inches, and wherein the ground plane is at least 4 feet in diameter.

6. An antenna assembly comprising:

a plurality of antenna elements disposed in a circular pattern and equidistant from each other in angular separation relative to a common reference point at a center of the circular pattern, wherein the antenna assembly includes or is operably coupled to a phase control module configured to apply selected phase fronts to each of the antenna elements to generate constructive and destructive interference patterns to define a directive beam in a desired direction, wherein the selected phase fronts include no phase adjustment, a positive phase adjustment value and a negative phase adjustment value, the positive and negative phase adjustment values each having a same magnitude, and wherein the phase control module is disposed at a remote radio head provided between the antenna assembly and a beamforming control module, the beamforming control module being configured to provide instructions to the phase control module for generating the selected phase fronts.

7. The antenna assembly of claim 6, wherein the phase control module is configured to apply no phase adjustment to antenna elements disposed such that a radius from a center of the circular pattern is substantially perpendicular to a direction of a central axis of a resultant directive beam formed by the antenna assembly, wherein the positive phase adjustment value is applied at least to an antenna element having a radius from the center extending in the direction of the central axis of the resultant directive beam, and wherein the negative phase adjustment value is applied at least to an antenna element having a radius from the center extending opposite the direction of the central axis of the resultant directive beam.

8. The antenna assembly of claim 1, wherein, responsive to operation of the phase control module, the antenna assembly is configurable to steer a directive beam 360 degrees in azimuth with a fixed beamwidth in elevation.

9. The antenna assembly of claim 8, wherein the antenna assembly is configured to be disposed on an aircraft, and wherein the fixed beamwidth in elevation is directed toward the horizon.

10. A phase control module for control of an antenna assembly comprising a plurality of antenna elements disposed in a circular pattern and equidistant from each other in angular separation relative to a common reference point at a center of the circular pattern, the phase control module comprising processing circuitry configured to apply selected phase fronts to each of the antenna elements to generate constructive and destructive interference patterns to define a directive beam in a desired direction, wherein the selected phase fronts include no phase adjustment, a positive phase adjustment value and a negative phase adjustment value, the positive and negative phase adjustment values each having a same magnitude, and wherein the positive phase adjustment value is 107° and the negative phase adjustment value is −107°.

11. The phase control module of claim 10, wherein the phase control module is disposed at a remote radio head provided between the antenna assembly and a beamforming control module, the beamforming control module being configured to provide instructions to the phase control module for generating the selected phase fronts.

12. The phase control module of claim 11, wherein the phase control module is configured to apply no phase adjustment to antenna elements disposed such that a radius from a center of the circular pattern is substantially perpendicular to a direction of a central axis of a resultant directive beam formed by the antenna assembly, wherein the positive phase adjustment value is applied at least to an antenna element having a radius from the center extending in the direction of the central axis of the resultant directive beam, and wherein the negative phase adjustment value is applied at least to an antenna element having a radius from the center extending opposite the direction of the central axis of the resultant directive beam.

13. The phase control module of claim 12, wherein, responsive to operation of the phase control module, the antenna assembly is configurable to steer a directive beam 360 degrees in azimuth with a fixed beamwidth in elevation.

14. The phase control module of claim 13, wherein the antenna assembly is configured to be disposed on an aircraft, and wherein the fixed beamwidth in elevation is directed toward the horizon.

15. A method comprising:

receiving an indication of a location of a ground station relative to an in-flight aircraft;

determining a pointing direction for steering a directive beam toward the location; and employing a phase control module for control of an antenna assembly of an aircraft to steer the directive beam toward the location, the antenna assembly comprising a plurality of antenna elements disposed in a circular pattern and equidistant from each other in angular separation relative to a common reference point at a center of the circular pattern, wherein employing the phase control module comprises applying selected phase fronts to each of the antenna elements to generate constructive and destructive interference patterns to define the directive beam, wherein the selected phase fronts include no phase adjustment, a positive phase adjustment value and a negative phase adjustment value, the positive and negative phase adjustment values each having a same magnitude, wherein applying the selected phase fronts comprises applying no phase adjustment to antenna elements disposed such that a radius from a center of the circular pattern is substantially perpendicular to a direction of a central axis of the directive beam, wherein the positive phase adjustment value is applied at least to an antenna element having a radius from the center extending in the direction of the central axis of the directive beam, and wherein the negative phase adjustment value is applied at least to an antenna element having a radius from the center extending opposite the direction of the central axis of the directive beam.

* * * * *